United States Patent [19]

Pearson et al.

[11] 4,102,586
[45] Jul. 25, 1978

[54] SPRING FASTENER CLIPS FOR WOODEN FURNITURE RAILS

[75] Inventors: Kenneth Carlton Pearson, Glenview; Harrison Church Lingle, Northbrook, both of Ill.

[73] Assignee: Hartco Company, Lincolnwood, Ill.

[21] Appl. No.: 810,202

[22] Filed: Jun. 27, 1977

[51] Int. Cl.² .............................................. F16F 3/02
[52] U.S. Cl. .................................. 403/188; 5/259 R; 267/110; 403/283
[58] Field of Search ................ 267/102, 103, 110–112, 267/259 R; 5/262–266; 403/282, 188, 283, 389; 85/13, 21, 84; 24/85 B, 86 B; 312/71; 248/217.3

[56] References Cited

U.S. PATENT DOCUMENTS

| | | | |
|---|---|---|---|
| 2,620,705 | 12/1952 | Podvinecz et al. | 85/13 |
| 3,672,738 | 6/1972 | Buttriss | 312/71 |
| 3,683,738 | 8/1972 | Kyriakos | 85/13 |
| 3,720,960 | 3/1973 | Bond | 5/259 R |
| 3,761,970 | 10/1973 | Fredman | 5/201 |
| 3,773,310 | 11/1973 | Crosby | 267/110 |

*Primary Examiner*—Casmir A. Nunberg
*Attorney, Agent, or Firm*—Edward R. Lowndes

[57] ABSTRACT

A metallic clip for holding the end bar of a sinuous cushion-supporting spring in position on the wooden rail of an article of furniture and having a horizontal base portion which seats on the top surface of the rail and a downturned flange which lies flush with the outside face of the rail, such flange having rail-penetrating anchor prongs which, when the clip is applied enters the wood transversely of the general plane of the wood grain, preferably at a right angle so as to inhibit splitting of the rail. The clip is formed from a flat metal blank by a punch press stamping operation in such a manner so that each prong is shorter than the width of the blank with the two prongs interfitting so that when they are bent out of the plane of the flange. Because the prongs are struck laterally from the vertical flange of the clip, they do not constitute added metal and therefore a considerably narrower continuous strip may be fed to the punch press in the production of successive clips, thus reducing the amount of metal required in the production of a given number of clips.

11 Claims, 14 Drawing Figures

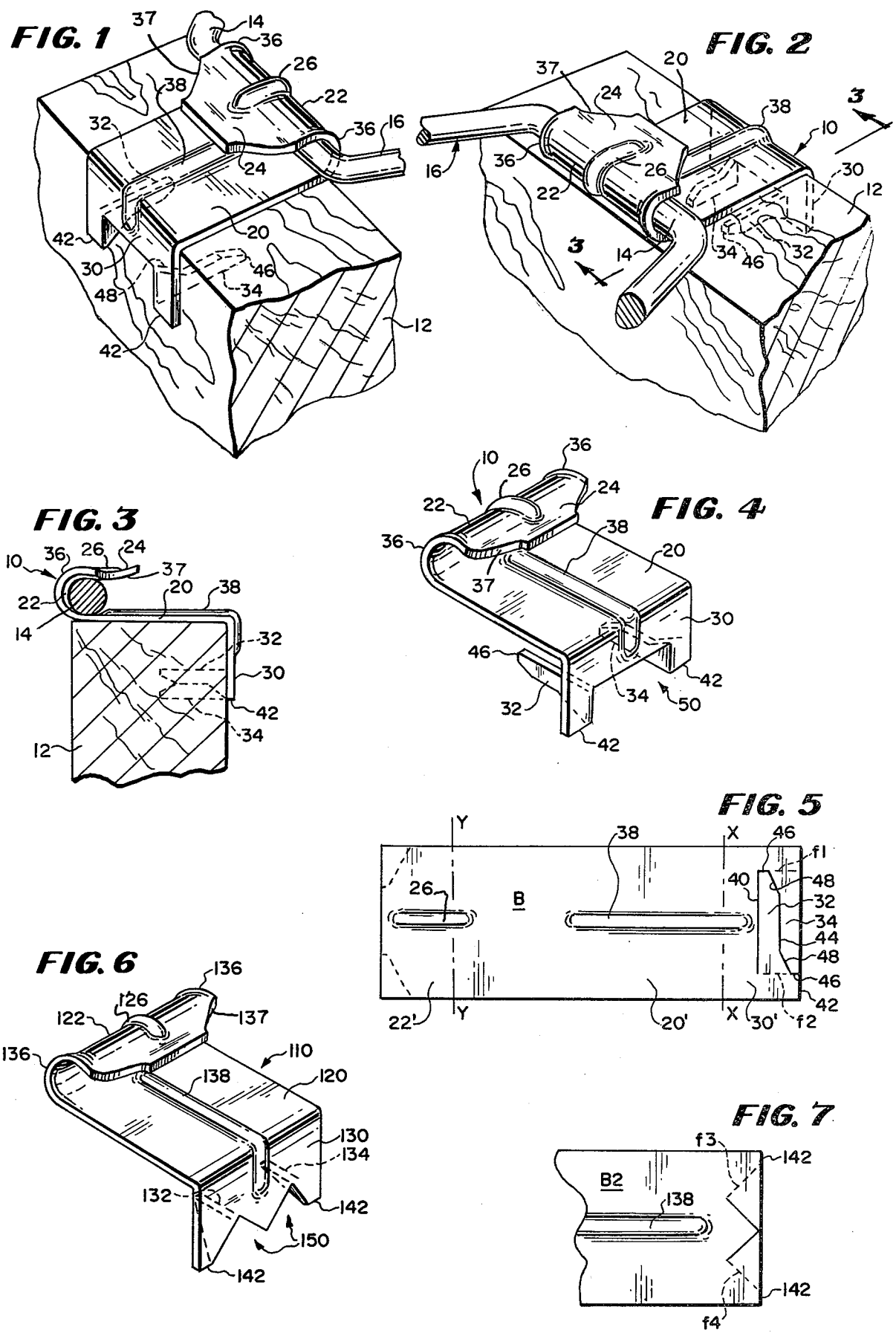

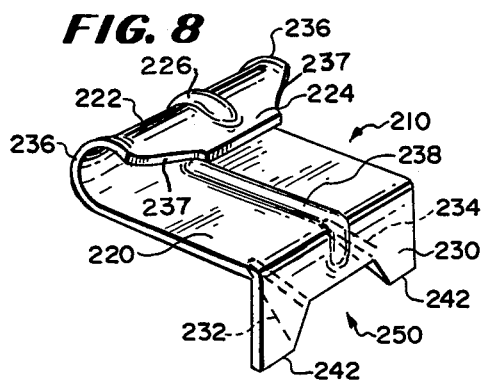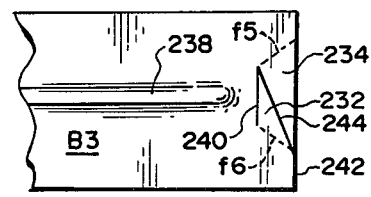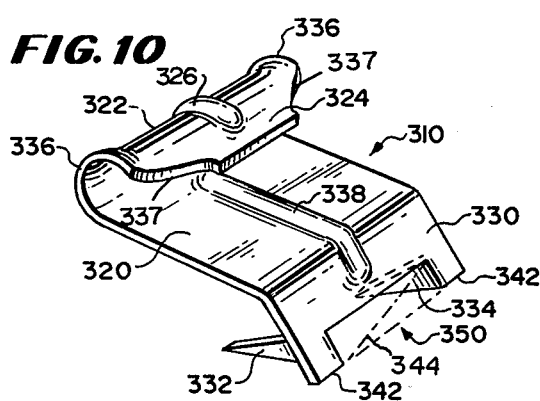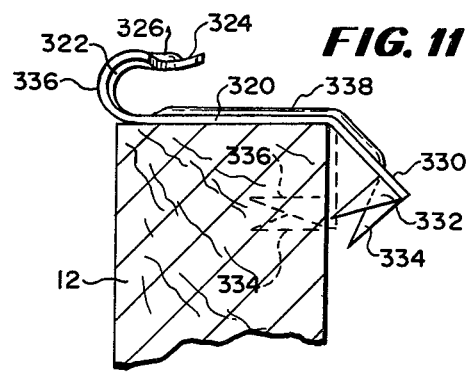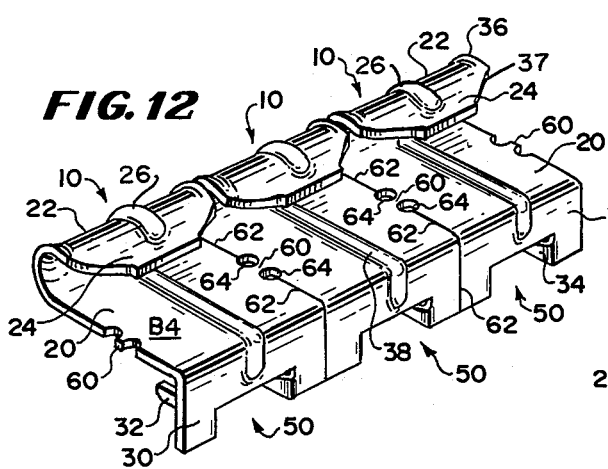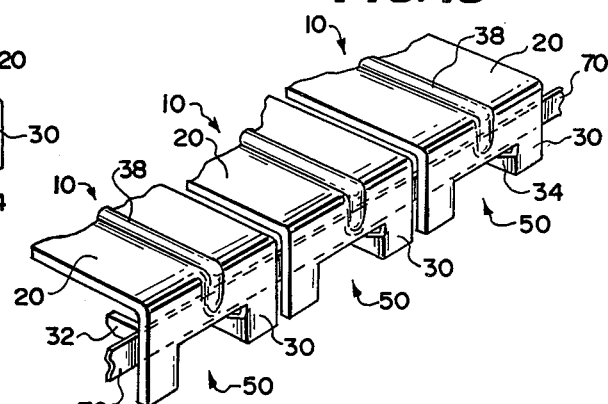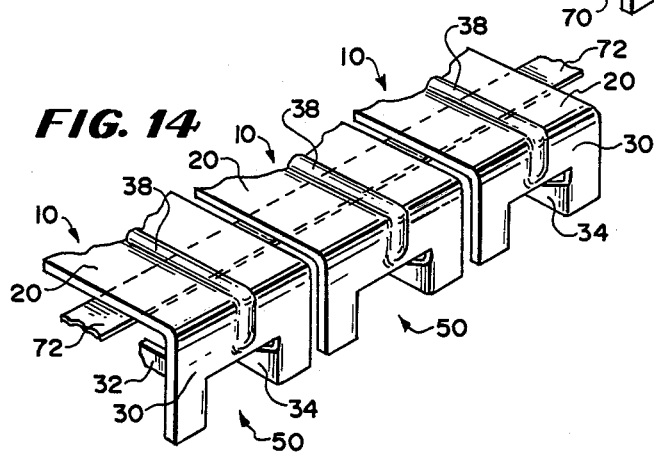

SPRING FASTENER CLIPS FOR WOODEN FURNITURE RAILS

The present invention relates to self-sustaining fastener clips of the type which are applied to the wooden rails of furniture frames for anchoring the end bars of sinuous cushion-supporting springs in position on such rails. The invention is particularly concerned with a sheet metal clip of the type having a flat horizontal spring-supporting base portion which seats on the upper face of the wooden rail and has a downwardly extending vertical leg which lies flush with the outside face of the rail and from which there projects laterally one or more tangs or prongs which are driven or pressed into the rail for clip-supporting purposes. Exemplary of such a clip is U.S. Pat. No. 3,720,960, to Bond, granted on Mar. 20, 1973 and entitled "Spring Attachment Clip."

In the aforementioned Bond patent, because neither nails or staples are employed to hold the clip in position, it is necessary that the prongs deeply penetrate the wood of the rail. This patent is exemplary of a large number of other patents which employ vertical legs having wood-penetrating anchor prongs and, as a general rule, such clips utilize prongs which enter the wood in a direction parallel to the grain of the wood, thereby creating a tendency for the wood to split. Wood-splitting is therefore a serious limitation that is attendant in connection with furniture clips of the character under consideration.

Another limitation that is present in connection with sheet metal prong-equipped anchor clips designed for furniture use resides in the fact that the fashioning of the clips by a punch press operation results in the loss of considerable discard or waste material. This is especially true where the clips are successively severed and formed sidewise from a continuous length of sheet metal strip stock. Such clips, as exemplified by the Bond patent, generally speaking, are of C-shape configuration and they include a first horizontal flat base portion which rests upon the top surface of the rail, a second vertical portion or leg which lies flush with and closely hugs the outside face of the wooden rail, and a third horizontal wood-penetrating portion which is driven into the rail and usually embodies a pair of pointed anchor prongs to enhance wood-penetration of the rail. These three portions are connected together by right angle bends, thus establishing a rectilinear C-shaped clip. In the flat blank of metal strip stock from which the clips are successively severed and formed, the overall width of the strip is necessarily the sum of these three portions.

The present invention is designed to overcome the above noted limitations that are attendant upon the construction and use of sheet metal furniture clips of the type under consideration and, toward this end, the invention contemplates the provision of a novel sheet metal clip which is completely self-supporting on the furniture rail and requires no nails, staples or other extraneous attachment means for maintaining it in its fixed position and which, for this purpose, employs a pair of anchor prongs which, when driven into the wood of the furniture rail, lie in planes that, in the preferred form of the invention, extend vertically, i.e. at right angles to the grain of the wooden rail and which, therefore, has little or no tendency to cause splitting of the wood. Moreover, in the punch press operation, these prongs instead of being outstruck from an excess length of metal that lies outside the metal from which the downturned legs are formed, are struck from the length of metal which, itself, forms the downturned legs so that no such outside length of metal is required in the elongated continuous strip which is fed to the punch press and, therefore, the feed strip may be of considerable less width than has heretofore been required, thus resulting in an appreciable saving of metal. Moreover, the anchor prongs, instead of being struck from the punch press strip along coplanar fold lines that extend horizontally in the completed clips, are struck from spaced apart parallel fold lines that extend vertically in the completed clip and the metal between such fold lines is slit in what will hereinafter be referred to as in a generally diagonal fashion. A slit is also formed between the inner ends of the parallel fold lines and such slits establish two overlapping generally tapered anchor prong bodies which originally lie in the plane of the clip blank and are subsequently bent or folded out of such plane at right angles thereto to produce two generally tapered anchor prongs, one of which, in the completed clip, assumes a lower elevation than the other. Thus, even with a wooden rail which is constructed of inferior of soft wood which has a natural tendency to split, or one which has become prone to splitting after a long period of age, the different elevation of one prong relative to the other prong obviates any slight tendency for a combined distribution of wood disrupting forces by the two anchor prongs. Furthermore, because of the overlapping relationship of the two anchor prongs in the slitted but unformed blank, no sacrifice in anchor prong length is present and both anchor prongs possess sufficient length for relatively deep wood penetration so that auxiliary fastening nails or staples are not required to hold the clip in place on the furniture rail.

Several modifications of the present spring fastener clip of the present invention are disclosed herein, some of them resulting in anchor prongs which do not overlap in the flat blank so that their effective length is somewhat shorter than in the preferred form of the clip and in which such prongs, instead of extending at a right angle to the grain of the wood of the furniture rail, extend at a steep angle on the order of 45° relative thereto. However, in all of the illustrated modifications of the invention, the essential features thereof are at all times preserved.

A further feature of the present invention resides in a novel means whereby any of the various forms of clips illustrated and described herein may be constructed as a rigid length or "stick" of contiguous clips, arranged in side-by-side or edge-to-edge relationship with adjacent clips being rigidly connected together by a small frangible web of the sheet metal material. When constructed in this manner such a stick of clips is designed for magazine feed purposes in connection with a suitable clip-applying tool, the individual clips being successively separated from the magazine stick or strip by fracturing the associated webs between adjacent clips.

In a modified form of magazine feed, any of the illustrated clips are connected together in side-by-side relationship to produce a flexible string of clips by the use of a magazine tape which is adhered to the various clips in an appropriate fashion, all in a manner that will be made clear presently.

The provision of a furniture clip such as has briefly been outlined above, and possessing the stated advantages, constitutes the principal object of the present invention. Numerous other objects and advantages of the invention, not at this time enumerated, will become readily apparent as the nature of the invention is better understood.

In the accompanying two sheets of drawings forming a part of this specification, several illustrative embodiments of the invention have been shown.

In these drawings:

FIG. 1 is a fragmentary inside perspective view of one rail of a furniture frame assembly, showing a preferred form of the improved metal fastener clip operatively applied thereto and also showing the clip in supporting relationship with respect to one end bar of a sinuous cushion-supporting spring;

FIG. 2 is an outside fragmentary perspective view of the structure shown in FIG. 1;

FIG. 3 is a sectional view taken substantially on the line 3—3 of FIG. 2 and in the direction of the arrows;

FIG. 4 is an enlarged perspective view of the metal clip in its free state;

FIG. 5 is a plan view of the blank from which the clip of FIGS. 1 to 4 inclusive is formed;

FIG. 6 is a perspective view, similar to FIG. 4, showing a modified form of clip embodying the invention;

FIG. 7 is a fragmentary plan view of one end region of the blank from which the clip of FIG. 6 is formed;

FIG. 8 is a perspective view, similar to FIGS. 4 and 6, showing an additional modified form of clip embodying the invention;

FIG. 9 is a fragmentary plan view of one end region of the blank from which the clip of FIG. 8 is formed;

FIG. 10 is a fragmentary perspective view, similar to FIGS. 5, 6 and 8, showing yet another modified form of clip embodying the invention;

FIG. 11 is a sectional view, similar to FIG. 3, illustrating schematically the manner in which the clip of FIG. 10 is applied to the rail;

FIG. 12 is a fragmentary perspective view of a length of interconnected clips, illustrating the manner in which a series of the clips of FIG. 1 may be fashioned from an elongated blank of sheet metal clip material;

FIG. 13 is a fragmentary perspective view, similar to FIG. 12, illustrating the manner in which a strip of clips embodying the invention may be connected together by a flexible carrier strip which is applied to the leg portions of the clip; and FIG. 14 is a fragmentary perspective view, similar to FIG. 13, illustrating the manner in which the clips may be connected together by a carrier strip which is applied to the base or body portions of the clips.

Referring now to the drawings in detail, and in particular to FIGS. 1 to 4 inclusive, a preferred form of spring fastening clip embodying the principles of the present invention is designated in its entirety by the reference numeral 10 and it is designed for attachment to one rail 12 of a cushion-supporting wooden frame associated with the seat or backrest of an article of furniture such as a sofa, chair or the like. If it is assumed that the rail 12 is the front rail of such an article of furniture, it will be understood that the rail opposes a parallel back rail and that it is the function of the clip 10 to support the end bar 14 of one of a series of bowed sinuous spring strips or members 16 which extend between the rails. The clips 10 are arranged in opposed pairs on the front and back rails, each pair serving to support therebetween one of the spring members 16.

Referring now particularly to FIG. 4, the preferred form of clip is preferably formed from an elongated strip of sheet metal stock, preferably steel, by a punch press operation, and each clip involves in its general organization a flat base portion 20, one end of which is formed with a reentrant or reverse curved bend 22, thus establishing an upper portion 24 which overlies the base portion 20 by a distance approximately equal to the diameter of the rod stock from which the sinuous spring member 16 is formed. Such reentrant or reverse bend 22 and overlying portion 24 establishes, in effect, a hook-like arrangement which is adapted to receive therein the aforementioned end bar 14 of one of the spring members 16. A reinforcing rib 26 is centrally formed in the reverse bend 22.

The clip is adapted to seat upon the upper horizontal face of the rail 12 and, when so seated, means are provided for securely anchoring the clip in position on the rail without the need for employing nails, staples or other extraneous fastening devices, the clip being thus self-sustaining on the rail. Accordingly, the base portion 20 is adapted to rest squarely on the upper horizontal face of the rail 12 as shown in FIGS. 1, 2 and 3 and the outer end edge of the base portion 20 is formed with a downwardly extending right angle flange or leg portion 30 which is adapted to extend downwardly alongside the outer vertical face of the rail as best shown in FIG. 3 and which is provided with a pair of anchor prongs or tangs 32 and 34 which, when driven into the wooden material of the rail 12, maintains the clip 10 properly positioned on such rail. These anchor prongs 32 and 34, the relationship which they bear to the leg portion 30, and the manner in which they are caused to penetrate the wooden material of the rail 12 constitute the principal features of the present invention and their character will be set forth in detail presently.

Still referring to FIGS. 1 to 4 inclusive, the opposite edge regions of the reentrant bend or hook 22 are flared outwardly as indicated 36, such flaring thereof serving to protect the edges of the hook or bend portion 22 from cutting into the material of the end bar 14 of the spring and, more importantly, serving to prevent these edges from cutting through any cushioning liner that may be nested within the hook or bend portion to eliminate noise or squeaks when downward seating pressure is applied to the spring, the use of such cushioning liners being common practice in the art. If desired, the distal corners of the reverse bend 22 may be truncated as indicated 37. In order to rigidify the clip 10 as a whole, a central reinforcing rib 38 may be provided on the base portion 20, such rib extending around the right angle bend and terminating a short distance below the upper edge of the leg portion 30.

Considering now the nature and function of the anchor prongs or tangs 32 and 34, it has previously been stated that the clip 10 is formed from flat sheet metal stock and in FIG. 5, an individual blank B from which the clip 10 is formed is shown in this view and designated in its entirety by the letter B. The clip is formed by progressive punch press operations and in FIG. 5 the blank B represents the flat blank after an initial stamping and slitting operation has been performed thereon but before the reentrant bend or hook portion 22 has been fabricated.

Considering the blank B of FIG. 5 in detail, such blank is rectangular in configuration and the broken line x—x indicates the axis of the right angle bend which constitutes the juncture between the vertical leg portion 30 and the horizontal base portion 20. The broken line y—y indicates the transverse line where the reentrant bend or hook portion 22 commences during a subsequent punch press operation. The sections of the blank B which provide the base portion 20, the reentrant bend or hook portion 22, and the leg portion of the clip 10 have been designated by similar reference numerals but with the prime affixes.

The aforementioned anchor prongs 32 and 34 are formed from the leg section 30' of the blank B by the simple expedient of slitting the section in such a manner as to establish the two anchor prongs 32 and 34 in the plane of the blank as shown in FIG. 5, and then bending such legs laterally out of the plane of the blank. In the flat blank, the two legs 32 and 34 are of identical configuration but they are arranged in complementary interfitting relationship within the confines of a limited rectangle, one long side of which is established by a transversely extending slit 40, the other long side of which is established by a portion of the adjacent transverse edge 42 of the blank B, and the two short sides of which are established by a pair of dotted fold lines f1 and f2 which extend in the longitudinal direction of the blank. The division between the two complementary anchor prongs 32 and 34 is established by a generally diagonal slit 44 which, if desired, may be a true linearly straight diagonal line which would render the two anchor prongs triangular in configuration but which, in the preferred form of the invention, is a generally zigzag slit so as to inpart certain shape characteristics to the anchor prongs as will be set forth in detail presently. After the aforementioned slits 40 and 44 have been effected in the blank, the latter is bent along the axis x—x to establish the downwardly extending vertical leg section 30 and the two anchor prongs 32 and 34 are bent laterally out of the plane of the blank so that they extend in parallelism as shown in FIG. 4. Since the center line of the prong 32 is removed from the edge 42 of the blank a greater distance than is the center line of the prong 34, the elevation of this former prong in the completely formed clip is somewhat higher than the elevation of the latter prong and, for this reason, the leg 32 will be referred to hereinafter as the upper prong while the prong 34 will be referred to as the lower prong. As best shown in FIG. 1, each prong 32 or 34, as the case may be, provided with a slightly blunt but nevertheless narrow tapered distal end 46 and a widened tapered proximate end 48 which is a shear complement of the tapered end 46.

Considering now the completed blank B after the two legs 32 and 34 have been folded out of the plane of the vertical leg 30 as shown in FIG. 4, it is to be noted that the leg 30 is provided with what, in effect, amounts to a rectangular void or recess 50, the vertical side edges of which establish bend or fold lines for the two anchor prongs 32 and 34 in order that, after the folding or bending operation, these prongs will lie in respective vertical planes so that when the anchor prongs are driven into the wooden material of the rail 12 (FIGS. 1 and 3) the planes of such prongs lie counter to, i.e. at substantially a right angle to, the grain of the wood. By thus causing the prongs 32 and 34 to enter the wood vertically, splitting of the rail which frequently takes place when horizontally disposed prongs are employed, is avoided. This vertical disposition of the prongs 32 and 34 constitutes one of the principal features of the present invention.

It is to be observed at this point that although in the exemplary form of the invention shown in FIG. 3 for example the clip 10 presents no appreciable amount of overhang beyond the inside edge of the rail 16, it is within the purview of the invention to provide an appreciable overhang if desired. In such an instance any downward thrust upon the sinuous spring 16 incident to a person sitting on the cushion associated with the article of furniture might cause an appreciable upward thrust upon the leg portion 30 of the clip, tending to unseat the latter. However, due to the fact that the distance between the fold axis x—x and the slit 40 is of considerable extent, any such upward pull on the leg 30 will be resisted and there will be no danger of woodsplitting. With conventional clips having horizontally disposed anchor prongs, invariably it is necessary for a satisfactory clip to provide a leg such as the leg 30 of appreciable vertical extent and to provide the prongs on the lower edge of such leg to avoid slicing the wood of the rail too close to the upper edge thereof. In the present clip 10, it is possible to fashion the leg 30 of somewhat less vertical extent than the legs of conventional clips because the prongs 32 and 34 are struck from within the confines of the leg 30 and therefore do not represent excess metal exteriorly of the leg 30. This results in the saving of a considerable amount of the metal which is required to produce the clip. It is also to be particularly noted that because of the complementary interfitting relationship of the two anchor prongs 32 and 34 in the blank B as shown in FIG. 5, there is practically no loss of discarded metal between the prongs during the punch press operations.

In applying the clip 10 to the rail 16, a hammer or other impact tool may be applied to the leg 30 to drive the anchor prongs 32 and 34 into the wood of the rail 16 or, alternatively, a suitable jaw-type pressing tool may be employed to squeeze the clip into position, such a tool being shown and described in a presently allowed copending application of Harrison C. Lingle, Ser. No. 679,904, filed Apr. 26, 1976 and entitled "Self-Sustaining Spring Fastener Clips for Furniture Rails and Assemblies therefor."

Finally, it is to be noted that under certain circumstances it may be considered desirable to fashion the two anchor prongs 32 and 34 so that their effective individual widths are somewhat narrower than the widths of the illustrated prongs. This may readily be accomplished by widening the slit 44 which separates the two prongs in the blank B, thus providing an appropriately shaped slot instead of the illustrated slit 44 (FIG. 5). In such an instance a practically negligible amount of discarded metal would be encountered in the punch press operation, while at the same time the essential features of the invention would be preserved.

In FIGS. 6 and 7 a slightly modified form of clip 110 is illustrated. In this form of the invention the base portion 120 and reentrant bend or hook portion 122 remain substantially the same as the corresponding portions 20 and 22 of the clip 10 of FIG. 4 but the leg portion 130 has been altered so that the rectangular recess 50 (FIG. 4) is replaced by two adjacent triangular recesses 150 and the fold lines f3 and f4 (FIG. 7) for the anchor prongs 132 and 134 extend at an angle on the order of 45° from the end edge 142 of the blank B2 and at substantially a right angle to each other. In this latter form of the invention there are no upper and lower anchor prongs, both prongs being triangular and assuming the same elevation in the completed blank and being inclined at an angle of approximately 45° from a vertical plane. The anchor prongs 132 and 134 are therefore one-half the length of the anchor prongs 32 and 34 while at the same time there is no loss of discarded metal in the punch press operation. Application of the clip 110 to a rail such as the rail 12 will ordinarily be effected by impact as previously described in connection with the clip 10 instead of using a jaw-type press mechanism in order to avoid bending of the anchor prongs 132 and 134 as they enter the wood of the rail. Otherwise the clip 110 remains substantially the same as the clip 10 and, in order to avoid needless repetition of description, similar reference numerals, but of a higher order, have been applied to the corresponding parts as between the disclosures of FIGS. 4 and 5, and FIGS. 6 and 7 respectively.

In FIGS. 8 and 9, a further modified form of clip 210 embodying the principles of the invention has been illustrated. In this latter form of the invention, the leg portion 230 has been altered to provide a trapezoidal void or recess 250 in place of the rectangular recess 50 (FIG. 4) of the clip 10 with the fold lines ƒ5 and ƒ6 extending at angles of approximately 45° from the end edge 242 of the blank B3 (FIG. 9) and at an angle of approximately 90° from each other. Otherwise the clip 210 remains substantially the same as the clip 10 and, again, in order to avoid repetition of description, similar reference numerals of a still higher order have been applied to the corresponding parts as between the disclosures of FIGS. 4 and 5 and FIGS. 8 and 9 respectfully. It is to be noted that in this latter form of clip 210, the anchor prong 232 becomes an upper prong when the clip is fully formed, while the prong 234 becomes a lower prong. It also is to be noted that because of the nature of the diagonal slit 244, the prong 232 becomes somewhat smaller in size than the prong 234.

Again, utilizing reference numerals of a higher order as between the disclosures of FIGS. 4 and 3, and FIGS. 10 and 11 respectively, another modification of the invention is disclosed in these two latter views wherein the clip 310 remains substantially the same as the clip 10 with the exception that the leg 330 is downturned at an angle on the order of 45° instead of at a right angle. Additionally, the upper and lower anchor prongs 332 and 334 are truly triangular and have pointed distal ends, this resulting from the fact that in the clip blank (not shown herein) the slit which corresponds to the slit 44, and which is shown by a broken line 344, is linearly straight and diagonal. The recess 350 remains rectangular so that the prong 332 represents the upper prong while the prong 334 represents a lower prong. The clip 310 is not readily susceptible to impact installation and, therefore, a jaw-type pressing tool such as the tool disclosed in the aforementioned allowed copending application, Ser. No. 679,904 will be used for clip installation purposes, the tool jaws serving to force the 45° angle leg 330 inwardly of the wooden rail 12 and thus cause the anchor prongs 332 and 334 to enter the wood of the rail at an angle of approximately 45° relative to the grain of the wood.

All of the previously described forms of clips 10, 110, 210 and 310 are susceptible to being manufactured for magazine feed purposes from a suitable clip applying tool wherein the adjacent clips of a string or length of clips are connected together. Considering the clip 10 for example, and referring particularly to FIG. 12, the individual clips 10 are shown as being connected together in side-by-side contiguous edge-to-edge fashion, the various clips being formed from a single elongated blank B4 of sheet metal. Each clip 10 is joined to its adjacent clips by narrow connecting webs 60, such webs existing by reason of a discontinuance of the clip-separation lines or slits 62 between the adjacent clips. A clean break-off between adjacent clips 10 may be enhanced during automatic application of successive clips to a rail such as the rail 12 of FIG. 1 by punching two small holes 64 on opposite sides of the web 60. After a particular clip break-off, a fragment of each web 60 will remain on the removed clip but such web fragments have not been illustrated in FIGS. 1 through 10 since the illustrated clips and their associated blanks illustrated in these views are not necessarily produced collectively as they are in FIG. 12.

In FIG. 13, a flexible string of clips 10 which is designed for magazine feed is disclosed. The clips are slightly spaced apart and are connected together by a flexible strip of magazine tape 70 or other ribbon-like carrier strip, the adhesive side of the tape being applied to the inner sides of the leg portions 30 of the clips 10 immediately above the recesses 50 so that such carrier strip overlies the various anchor prongs 32 and 34.

In FIG. 14, a flexible string of the clips 10 is shown as embodying a carrier strip 72 of ribbon-like design and which is adhered to the underneath sides of the body portions 20 of the various clips, so that it crosses each clip transversely and lies beneath the medial region of the body portion 20 thereof.

It will be understood that carrier strips similar to the strips 70 and 72 of FIGS. 13 and 14 respectively may be applied to a succession of any of the clips of FIGS. 4, 6 or 10 if desired with the carrier strips being similarly positioned relative to the various clips.

The invention is not to be limited to the exact arrangement of parts shown in the accompanying drawings or described in this specification as various changes in the details of construction may be resorted to without departing from the spirit of the invention. For example, the anchor prong configuration associated with the clip 10 which employs a vertically disposed leg 30 is capable of use in connection with a clip such as the clip 310 which has a 45° angle leg 330. Similarly, any of the anchor prong configurations and dispositions illustrated in the various views of the drawings are useable with either vertical or inclined clip legs. Finally, regardless of the leg angle or anchor prong configuration, adjacent clips may be connected together for magazine feed purposes by integral connecting webs such as the webs 60 of FIG. 12, or by magazine tape connections such as are shown in either FIGS. 13 or 14. Therefore, only insofar as the invention has particularly been pointed out in the accompanying claims is the same to be limited.

Having thus described the invention, what we claim and desire to secure by Letters Patent is:

1. A self-supporting integral sheet metal clip for securing one end of an upholstery spring to the horizontally grained wooden rail of an article of furniture, said clip being formed from an elongated generally rectangular flat blank of sheet metal stock and comprising: a stamping including a flat horizontal base portion designed for positioning on the top surface of the rail and adapted to support said end of the spring, the outer end of said base portion being provided with a downturned leg designed for face-to-face engagement with the outer side of the rail, the lower edge of said downturned leg being formed with a downwardly opening three-sided recess therein having spaced apart side edges of equal extent and which, when the clip is in position on the rail, traverse the wood grain of the rail at a relatively steep angle, the upper edge of recess extending horizontally, and an anchor prong projecting laterally at a right angle to the plane of the leg from each of said side edges and adapted to penetrate the wood of the rail when the leg is forced toward the latter, said side edges constituting fold lines along which the anchor prongs are bent laterally out of the plane of the blank, said anchor prongs being equal in extent to the width of the recess so that in the flat blank they overlap each other and substantially fill the space between the fold lines whereby, when the prongs are folded out of the blank, one prong assumes an elevation which is higher than the elevation of the other prong to the end that the prongs will penetrate the wood of the rail at different elevations.

2. A self-supporting clip as set forth in claim 1, wherein the inner end of said base portion is provided with a hook-like bend for receiving and supporting said one end of the spring.

3. An upholstery clip as set forth in claim 2, wherein said hook-like bend is formed with a curved outstruck centrally disposed longitudinal reinforcing rib which is substantially coextensive with such bend.

4. A self-supporting clip as set forth in claim 1, wherein the side edges of the recess, and consequently the fold lines for the anchor prongs, are vertical so that the recess is rectangular in outline, and the anchor prongs are of equal extent.

5. A self-sustaining clip as set forth in claim 1, wherein in the flat blank the adjacent edges of said anchor prongs are separated by a prong-dividing slit which extends in one diagonal direction of the recess whereby the proximate end of each anchor prong is substantially coextensive with its respective fold line, the distal end of one anchor prong in the flat blank is contiguous with the inner end of the fold line for the other anchor prong, while the distal end of said other anchor prong is contiguous with the outer end of the fold line for said one anchor prong.

6. A self-sustaining clip as set forth in claim 5, wherein said prong-dividing slit is linearly straight so that the prongs are uniformly tapered.

7. A self-sustaining clip as set forth in claim 1, wherein said downturned leg extends at an obtuse angle from the base portion of the clip, and said leg is designed for inward swinging movement toward the outer side of the rail for clip-applying purposes when said base portion is in position on the rail.

8. A self-sustaining clip as set forth in claim 1, wherein said base portion and downturned leg are formed with a continuous centrally disposed longitudinally extending outstruck reinforcing rib.

9. A sheet metal clip for securing one end of an upholstery spring to the horizontally grained wooden rail of an article of furniture, said clip being formed from a flat blank of sheet metal stock and comprising: a stamping including a flat horizontal base portion designed for positioning on the top surface of the rail and adapted to support said end of the spring, the outer end of said base portion being provided with a downturned leg designed for face-to-face engagement with the outer side of the rail, said downturned leg being formed with an opening therein having spaced apart side edges which, when the clip is in position on the rail, traverse the wood grain of the rail at a relatively steep angle, the upper edge of said opening extending horizontally, and an anchor prong projecting laterally at a right angle to the plane of the leg from each of said side edges and adapted to penetrate the wood of the rail when the leg is formed toward the latter, said side edges constituting fold lines along which the anchor prongs are bent laterally out of the plane of the blank, said anchor prongs being equal in extent to the width of the opening so that in the flat flank they overlap each other whereby, when the prongs are folded out of the plane of the blank, one prong assumes an elevation which is higher than the elevation of the other prong to the end that the prongs will penetrate the wood of the rail at different elevations.

10. A sheet metal clip for securing one end of an upholstery spring to the horizontally grained wooden rail of an article of furniture, said clip comprising: a stamping including a flat horizontal base portion designed for positioning on the top surface of the rail and adapted to support said end of the spring, the outer end of said base portion being provided with a downturned leg designed for face-to-face engagement with the outer surface of the rail, said downturned leg being formed with at least two anchor prongs which are outstruck from the metal of said leg along fold lines which extend at a relatively steep angle with respect to a vertical plane, to the end that such prongs will penetrate the wood of the rail counter to the grain of the latter when the clip is applied to rail incident to movement of said leg toward its face-to-face position against the outer side of the rail.

11. A self-supporting sheet metal clip as set forth in claim 10, wherein said outstruck anchor prongs assume different elevations on said downturned leg.

* * * * *

UNITED STATES PATENT AND TRADEMARK OFFICE
CERTIFICATE OF CORRECTION

PATENT NO. : 4,102,586

DATED : July 25, 1978

INVENTOR(S) : Kenneth Carlton Pearson and Harrison Church Lingle

It is certified that error appears in the above-identified patent and that said Letters Patent are hereby corrected as shown below:

Column 5, line 51, cancel the comma (,) and substitute --which opens downwardly and--. Column 7, lines 62 and 63, change "individual" to --adjoining--. Claim 1, line 16, after "edge of" insert --said--. Claim 3, line 1, change "An upholstery" to --A self-supporting--. Claim 5, line 1, change "self-sustaining" to --self-supporting--. Claim 6, line 1, change "self-sustaining" to --self-supporting--. Claim 7, line 1, change "self-sustaining" to --self-supporting--. Claim 8, line 1, change "self-sustaining" to --self-supporting--. Claim 9, line 17, change "formed" to --forced--; line 22, change "flank" to --blank--. Claim 10, lines 12 and 13, cancel "a relatively steep angle with respect to a vertical plane to the end that"; line 13, after "such" insert --an angle that the--; line 15, before "rail" insert --the--. Claim 11, line 1, cancel "self-supporting".

Signed and Sealed this

Twenty-seventh Day of February 1979

[SEAL]

Attest:

RUTH C. MASON
Attesting Officer

DONALD W. BANNER
Commissioner of Patents and Trademarks